(12) United States Patent
Ling et al.

(10) Patent No.: US 12,155,186 B2
(45) Date of Patent: Nov. 26, 2024

(54) SEALING DEVICE AND UNDERWATER MACHINERY EQUIPMENT

(71) Applicant: QINGDAO QIYUAN CXINKEJI CO., LTD, Shandong (CN)

(72) Inventors: Wei Ling, Shandong (CN); Jun Huang, Shandong (CN); Chong Zhang, Shandong (CN)

(73) Assignee: QINGDAO QIYUAN CXINKEJI CO., LTD, Shandong (CN)

( * ) Notice: Subject to any disclaimer, the term of this patent is extended or adjusted under 35 U.S.C. 154(b) by 298 days.

(21) Appl. No.: 17/764,484

(22) PCT Filed: Dec. 20, 2021

(86) PCT No.: PCT/CN2021/139735
§ 371 (c)(1),
(2) Date: Mar. 28, 2022

(87) PCT Pub. No.: WO2023/082430
PCT Pub. Date: May 19, 2023

(65) Prior Publication Data
US 2023/0146471 A1    May 11, 2023

(51) Int. Cl.
*H02G 3/18* (2006.01)
*H02G 15/013* (2006.01)

(52) U.S. Cl.
CPC ................................. *H02G 15/013* (2013.01)

(58) Field of Classification Search
CPC ........ H01R 9/03; H01R 13/42; H01R 13/424; H01R 13/40; H01R 13/52; H01R 13/5205; H01R 13/5808; H01R 13/5202; H01R 13/5825; H01R 13/73; H02G 3/18; H02G 3/22; H02G 15/013; H02G 15/007; H02G 15/04
USPC ... 174/74 R, 77 R, 650–654, 656–658, 72 R, 174/74 A; 439/607.44, 271, 587, 272, 439/519, 556, 588, 372, 592, 599, 603, 439/752
See application file for complete search history.

(56) References Cited

U.S. PATENT DOCUMENTS

| | | | | |
|---|---|---|---|---|
| 5,098,315 A | * | 3/1992 | Scowen | H01R 13/4367 439/589 |
| 6,814,617 B2 | * | 11/2004 | Oota | H01R 13/5205 439/589 |
| 7,614,910 B2 | * | 11/2009 | Croteau | H01R 13/521 439/573 |
| 8,513,543 B1 | * | 8/2013 | Lin | H02G 15/013 174/656 |

(Continued)

FOREIGN PATENT DOCUMENTS

| | | | | |
|---|---|---|---|---|
| CN | 2539020 Y | * | 3/2003 | ............... F16J 15/02 |
| CN | 209104778 U | * | 11/2018 | ........... H02G 15/013 |
| CN | 212829002 U | * | 3/2021 | ............. B63C 11/52 |

*Primary Examiner* — William H. Mayo, III
(74) *Attorney, Agent, or Firm* — Klarquist Sparkman, LLP

(57) ABSTRACT

A sealing device and underwater machinery equipment wherein the sealing device includes a sealing plug and a fixing assembly. The sealing plug is in fixed connection with multiple cables, and the fixing assembly is constructed to fix the sealing plug on a sealed cabin in an abutting manner, such that the sealing plug is occluded in the sealed cabin. The underwater machinery equipment includes the sealing device.

18 Claims, 4 Drawing Sheets

(56) References Cited

U.S. PATENT DOCUMENTS

| | | | |
|---|---|---|---|
| 8,803,006 B2* | 8/2014 | Imahori | H01R 13/65912 |
| | | | 439/271 |
| 9,059,534 B2* | 6/2015 | Endo | H01R 13/5205 |
| 9,106,066 B2* | 8/2015 | Sakakura | H01R 13/5808 |
| 9,570,899 B2* | 2/2017 | Tanaka | H02G 15/013 |
| 2012/0270444 A1* | 10/2012 | Kawamura | H01R 13/5202 |
| | | | 439/607.44 |

* cited by examiner

SEALING DEVICE AND UNDERWATER MACHINERY EQUIPMENT

CROSS-REFERENCE TO RELATED APPLICATION

This is the U.S. National Stage of International Application No. PCT/CN2021/139735, filed Dec. 20, 2021, which was published in English under PCT Article 21(2), which in turn claims the priority to the Chinese patent application filed with the Chinese Patent Office on Nov. 9, 2021, with the filing No. 202122727006.7 and entitled "Sealing Device and Underwater Machinery Equipment", all the contents of which are incorporated herein by reference in entirety.

TECHNICAL FIELD

The present disclosure pertains to the technical field of underwater sealing devices, and particularly to a sealing device and to underwater machinery equipment.

BACKGROUND ART

In recent years, with the scientific and technological advancements, various kinds of underwater machinery equipment are used more and more frequently in the detection and development of underwater resources. When the underwater machinery equipment completes underwater operations, it is usually required to use cables to connect the sealed cabin of the underwater machinery equipment with other functional equipment. At present, the commonly used sealing method for cables and sealed cabins includes: welding one end of each cable and sealing the male joint of a watertight joint with glue, fixedly providing the female joint of a corresponding watertight joint on the cabin body and sealing the same with glue, and then docking the male joint and the female joint. However, because watertight joints are expensive and complex in structure, making one set of watertight joints for each cable is not only expensive in cost, but also enables a relatively large space occupied in the sealed cabin, which is disadvantageous for arranging multiple cables in the case of limited space in the sealed cabin.

SUMMARY

The present disclosure provides a sealing device and a piece of underwater machinery equipment, so as to at least overcome deficiencies in the prior art.

In some embodiments of the present disclosure, a sealing device is provided, which can comprise a sealing plug (end cap) and a fixing assembly, wherein the sealing plug may be in fixed connection with multiple cables, and the fixing assembly may be constructed to fix the sealing plug on a sealed cabin in an abutting manner, such that the sealing plug is occluded in the sealed cabin.

In some possible implementation forms of the sealing device, the sealed cabin may be provided with a sealing hole, and the fixing assembly may fix the sealing plug in the sealing hole in an abutting manner.

In some possible implementation forms of the sealing device, the sealing plug may be in interference fit with the sealing hole; alternatively, the sealing plug and the multiple cables may be formed as an integrated structure by way of integrated injection molding.

In a possible implementation form of the sealing device, the sealing plug may include a connecting portion and a sealing portion, wherein the connecting portion is connected to the side of the sealing portion away from the sealed cabin, and the sealing portion is in interference fit with the sealing hole through the fixing assembly.

In some possible implementation forms of the sealing device, the connecting portion and the sealing portion may be in fixed connection with each other by way of integrated molding.

In some possible implementation forms of the sealing device, the diameter of the connecting portion may be greater than that of the sealing portion, and the diameter of the sealing portion decreases gradually along a direction away from the connecting portion.

In some possible implementation forms of the sealing device, the sealing hole may include a big hole and a small hole, and the big hole may cooperate with the connecting portion, while the small hole may cooperate with the sealing portion.

In some possible implementation forms of the sealing device, the diameter of the big hole may be greater than that of the small hole, and the diameter of the small hole may decrease gradually along a direction away from the big hole.

In some possible implementation forms of the sealing device, the thickness of the sealing plug may be greater than the depth of the sealing hole.

In some possible implementation forms of the sealing device, the fixing assembly may include a fixing block and a fixing piece, wherein the fixing block may be arranged on the side of the sealing plug away from the sealed cabin, and the fixing piece may be constructed to fix the fixing block on the sealed cabin, such that the fixing block compresses the sealing plug.

In some possible implementation forms of the sealing device, the sealed cabin may be composed of a cabin cover and a cabin body, wherein the cabin cover may be covered on the cabin body, the side of the cabin cover away from the cabin body is provided with the sealing hole, the sealing plug is occluded in the sealing hole, and when the multiple cables connect components inside the sealed cabin, the multiple cables and the sealed cabin are sealed in a waterproofing manner by means of the sealing device.

In some possible implementation forms of the sealing device, the fixing block may be provided with a first fixing hole, the cabin cover may be provided with a corresponding second fixing hole, and the fixing piece successively penetrates the first fixing hole and the second fixing hole and is arranged inside the cabin cover, so as to fix the sealing plug on the cabin cover and compress the same tightly.

In some possible implementation forms of the sealing device, a sealing ring may be sleeved over the cabin cover, and the sealing ring may be constructed to seal the junction between the cabin cover and the cabin body.

In some possible implementation forms of the sealing device, the fixing block may be composed of a first fixing block and a second fixing block, and the junction between the first fixing block and the second fixing block may be provided with at least one through hole, in which the cable may be arranged.

In some possible implementation forms of the sealing device, the diameter of the at least one through hole may be greater than the diameter of the cable.

In some possible implementation forms of the sealing device, the first fixing block and the second fixing block may be distributed symmetrically with respect to the junction between the first fixing block and the second fixing block serving as an axis.

In some possible implementation forms of the sealing device, the first fixing block and the second fixing block may be respectively provided with a first fixing hole, and the first fixing holes are symmetrically distributed on the first fixing block and the second fixing block with respect to the junction between the first fixing block and the second fixing block serving as an axis.

In some further embodiments of the present disclosure, a piece of underwater machinery equipment is further provided, which may comprise a sealing device as described above.

Compared with related technologies, the present disclosure at least has following beneficial effects.

As for the sealing device provided in the embodiments of the present disclosure, multiple cables are enabled to form an overall structure with the sealing plug by making the multiple cables simultaneously fixedly connected with the sealing plug, and the sealing plug is then fixed on the sealed cabin through the fixing assembly, hereby realizing the sealing between the multiple cables and the sealed cabin. Compared with the seal realized by means of a watertight joint, the sealing device according to the present disclosure is not only simple in structure, but also low in cost and relatively small in volume, thus is particularly suitable for use in circumstances in which the sealed cabin needs to connect multiplex functional equipment but has limited space.

In order to make the above-mentioned objects, features, and advantages of the present disclosure more evident and easier to understand, preferred embodiments will be specifically enumerated below and described in detail with reference to the accompanying drawings as follows.

BRIEF DESCRIPTION OF DRAWINGS

In order to more clearly describe the technical solutions of the embodiments of the present disclosure, the drawings required to be used in the embodiments will be simply presented below; and it shall be understood that the following drawings merely show certain embodiments of the present disclosure, and thus should not be deemed as limiting the scope thereof, and for a person ordinarily skilled in the art, further relevant drawings could be obtained according to these drawings without inventive efforts.

EXPLANATION OF MAIN ELEMENT SIGNS

Figure 1:
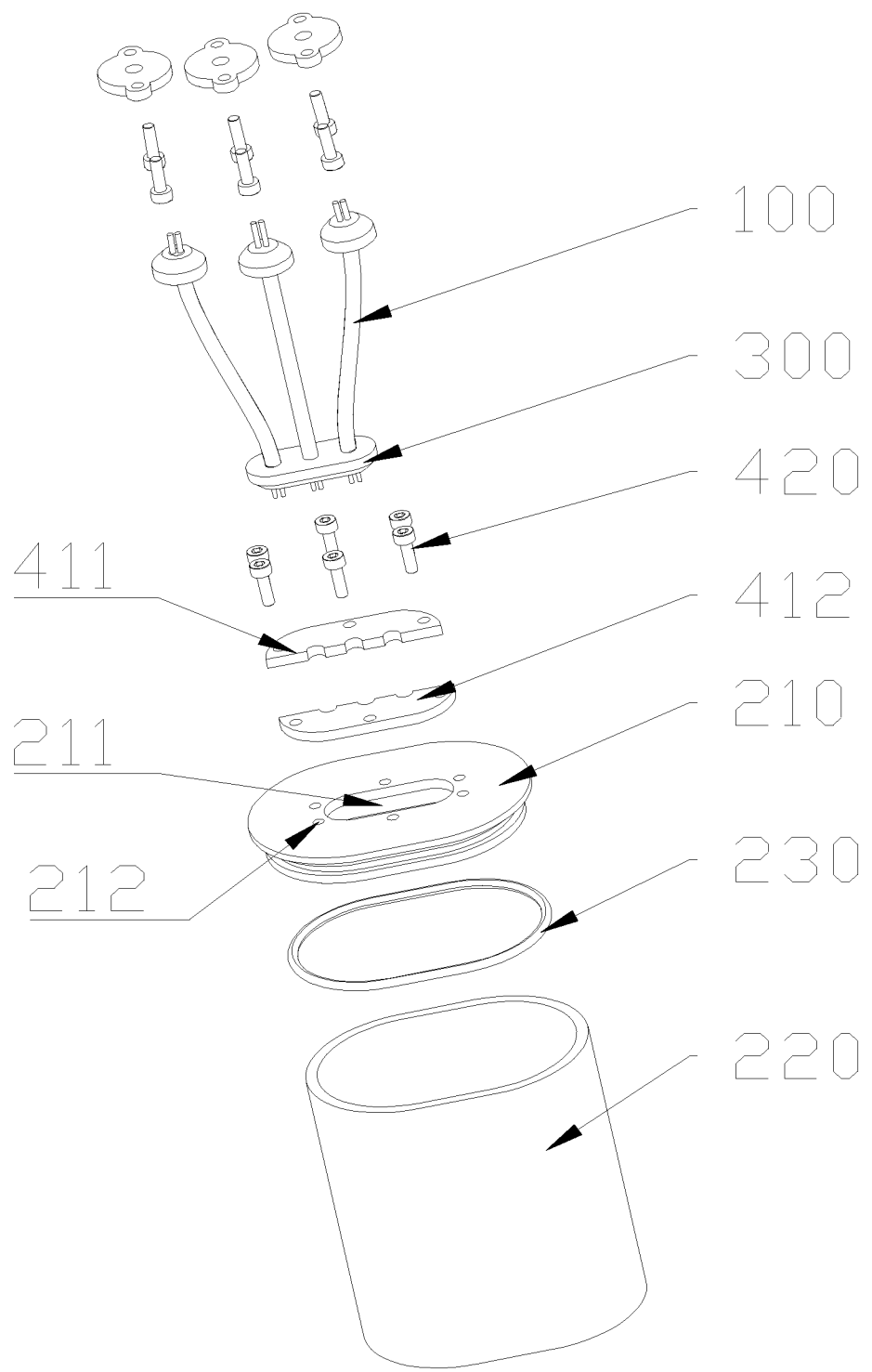
FIG. 1 shows a structural exploded view of a sealing device according to an embodiment.

100—cable; 200—sealed cabin; 210—cabin cover; 211—sealing hole; 2111—big hole; 2112—small hole; 212—second fixing hole; 220—cabin body; 230—sealing ring; 300—sealing plug; 310—connecting portion; 320—sealing portion; 400—fixing assembly; 410—fixing block; 411—first fixing block; 412—second fixing block; 420—fixing piece; 430—first fixing hole; 440—through hole.

DETAILED DESCRIPTION OF EMBODIMENTS

The embodiments of the present disclosure will be specifically described below, and examples of the embodiments are shown in the accompanying drawings, wherein same or similar reference signs represent same or similar elements or elements having same or similar functions throughout the context. The embodiments described below with reference to the drawings are illustrative, and merely serve to explain the present disclosure, thus should not be construed as limiting the present disclosure.

In the description of the present disclosure, it shall be understood that orientation or position relationships indicated by terms, such as "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", and "circumferential" are orientation or position relationships shown based on the accompanying drawings, merely intended to facilitate the description of the present disclosure and simplify the description, rather than indicating or implying that a specified device or element must have a specific orientation, and be constructed and operated in a certain orientation, and therefore cannot be construed as limiting the present disclosure.

In addition, terms such as "first" and "second" are used merely for purpose of description, and cannot be construed as indicating or implying to have importance in relativity, or implicitly suggesting the number of the indicated technical features. Therefore, a feature defined with a term "first" or "second" may explicitly or implicitly comprise one or more feature. In the description of the present disclosure, the meaning of the term "multiple" indicates two or more, unless otherwise expressly and specifically defined.

In the present disclosure, unless otherwise expressly specified and defined, terms such as "mount", "connect", "link", and "fix" shall be construed in a broad sense. For example, it may be fixed connection, or detachable connection, or integrated connection; it may be mechanical connection, or electrical connection; or it may be direct connection, or indirect connection via an intermediate medium, or inner communication between two elements or interactive relationship between two elements. For a person ordinarily skilled in the art, the specific meanings of the above-mentioned terms in the present disclosure could be construed in accordance with specific circumstances.

In the present disclosure, unless otherwise expressly specified and defined, the expression that a first feature is "on" or "under" a second feature could be construed in such a way that the first feature and the second feature are in direct contact, or the first feature and the second feature are in indirect contact through an intermediate medium. Moreover, the expression that a first feature is "over", "above", or "on top of" a second feature could be construed in such a way that the first feature is right or obliquely above the second feature, or merely indicates that the first feature is higher in horizontal height than the second feature. The expression that a first feature is "below", "underneath", or "beneath" a second feature could be construed in such a way that the first feature is right or obliquely below the second feature, or merely indicates that the first feature is lower in horizontal height than the second feature.

Hereinafter, a sealing device provided according to some embodiments of the present disclosure will be described in detail with reference to the accompanying drawings.

Referring to FIGS. 1 to 7, in some embodiments, the present disclosure provides a sealing device, which is constructed for performing sealing between multiple cables 100 and a sealed cabin 200 of underwater machinery equipment, so as to reduce the space of the sealed cabin 200 occupied when sealing the multiple cables 100.

Figure 2:
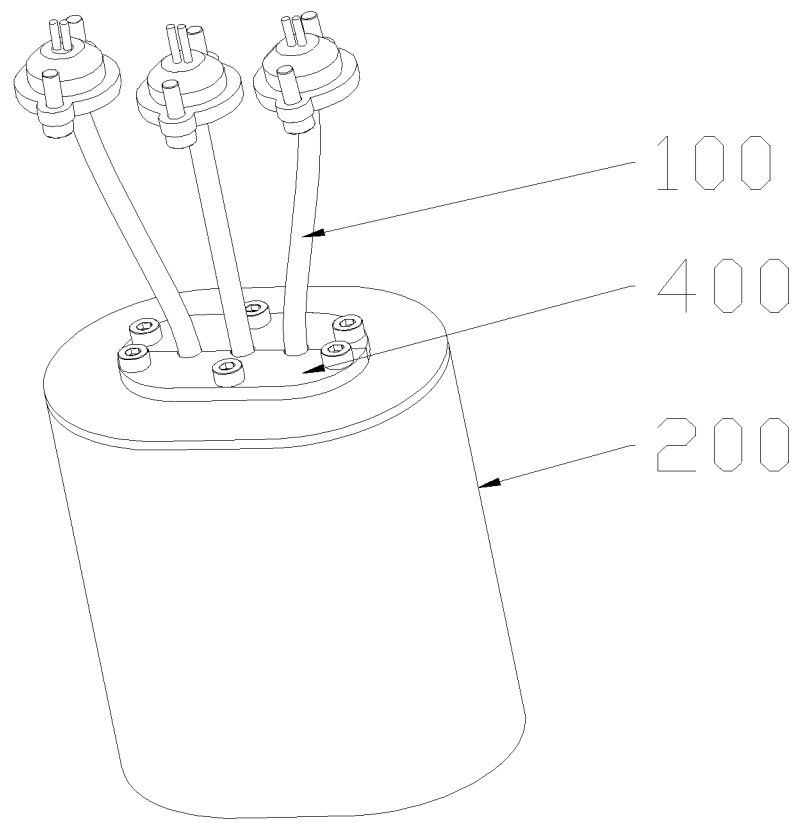
FIG. 2 shows a structural schematic diagram of a sealing device according to an embodiment.

As shown in FIGS. 1 and 2, the sealing device comprises a sealing plug 300 and a fixing assembly 400. At least two of the cables 100 are respectively fixed on the sealing plug 300, such that the multiple cables 100 and the sealing plug 300 are fixedly connected to form an overall structure. The sealed cabin 200 is provided with a sealing hole 211, and the sealing plug 300 cooperates with the sealing hole 211, such that the sealing plug 300 and the sealed cabin 200 are in sealed connection with each other. The fixing assembly 400 fixes the sealing plug 300 on the sealed cabin 200 and compresses the same tightly, such that the sealing plug 300 is in an interference fit with the sealing hole 211.

In some embodiments, the multiple cables 100 are respectively in sealed connection with the sealing plug 300 by means of an interference fit. However, without being limited thereto, it could be understood that in other embodiments, the sealing plug 300 and the multiple cables 100 are formed as an integrated structure by way of integrated injection molding, and such a forming way improves the integrity and the stability of the sealed connection between the sealing plug 300 and the cables 100 and reduces the overall volume of the multiple cables 100 and the sealing plug 300.

Figure 3:
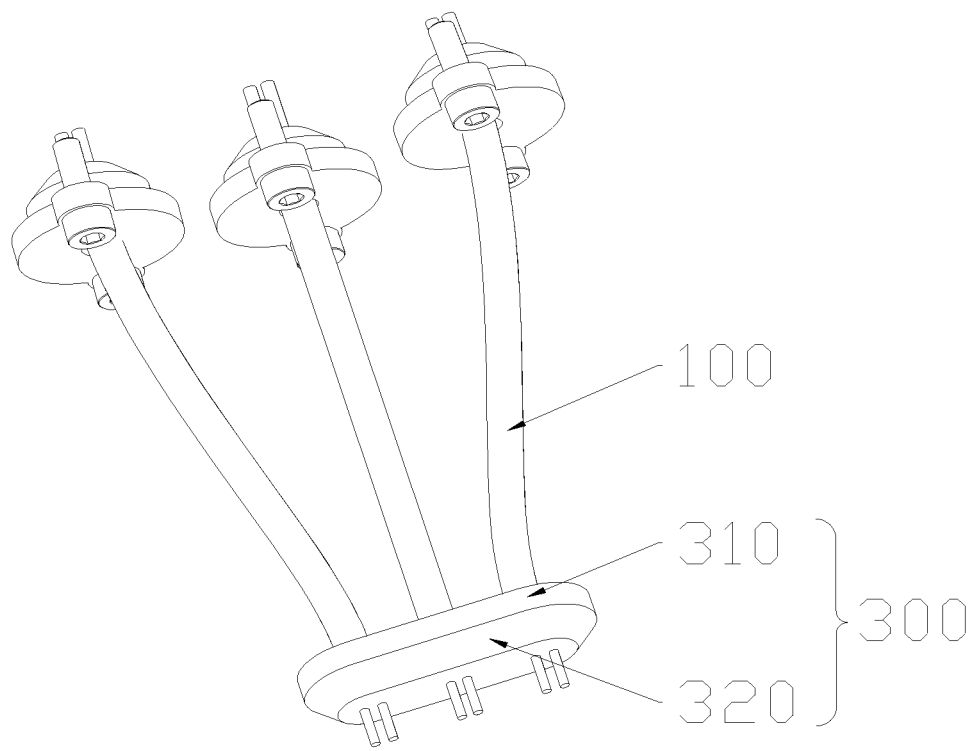
FIG. 3 shows a structural schematic diagram of cables and a plug according to an embodiment.

With reference to FIG. 3, in some embodiments, the sealing plug 300 includes a connecting portion 310 and a sealing portion 320, wherein the connecting portion 310 is away from the sealed cabin 200, the sealing portion 320 is closer to the sealed cabin 200, and the connecting portion 310 is connected to the side of the sealing portion 320 away from the sealed cabin 200.

In some embodiments, the connecting portion 310 and the sealing portion 320 are in fixed connection with each other by way of integrated molding. The connecting portion 310 and the sealing portion 320 are both made of an elastic material. When the connecting portion 310 is compressed, the pressure can be transferred to the sealing portion 320 through the connecting portion 310, such that the sealing portion 320 is in an interference fit with the sealing hole 211.

Figure 4:
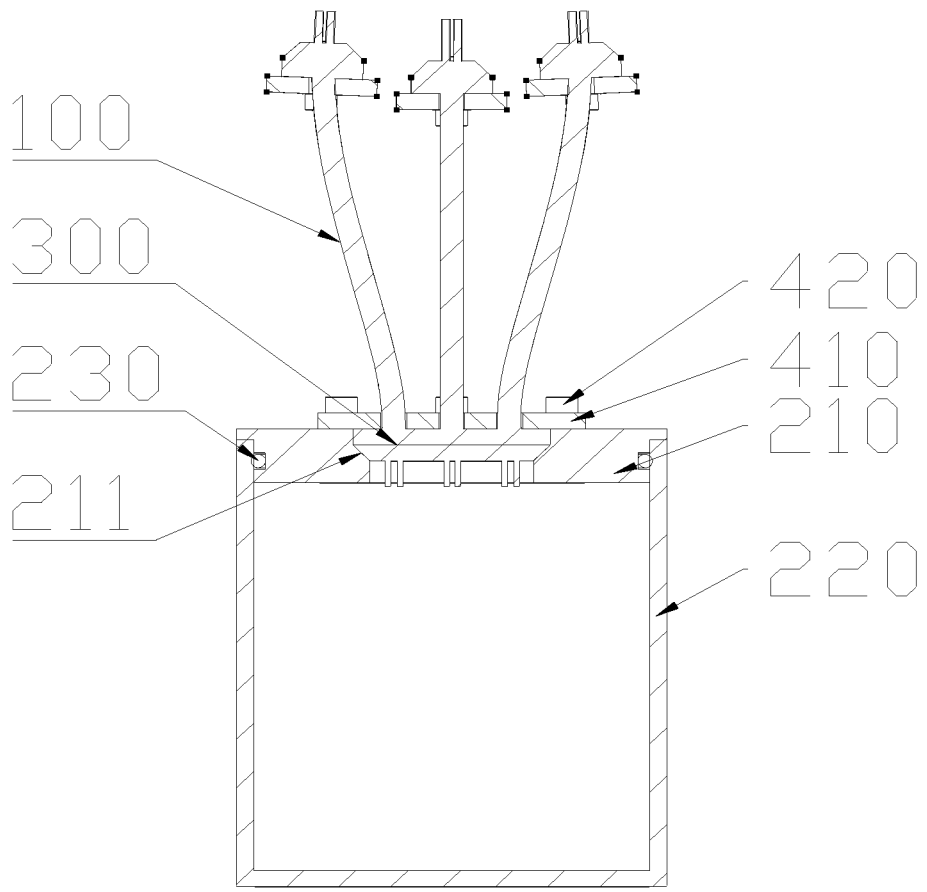
FIG. 4 shows a sectional view of a sealing device according to an embodiment.

With reference to FIG. 4, the diameter of the connecting portion 310 is greater than that of the sealing portion 320, and the diameter of the sealing portion 320 decreases gradually along a direction away from the connecting portion 310. The shape of the sealing hole 211 matches the shape of the sealing plug 300, such that the fixing assembly 400 can enable an interference fit between the sealing portion 320 and the sealing hole 211 by compressing the connecting portion 310 when the sealing plug 300 is arranged in the sealing hole 211, and the sealing plug 300 is then occluded in the sealing hole 211, hereby realizing the sealing.

Figure 5:
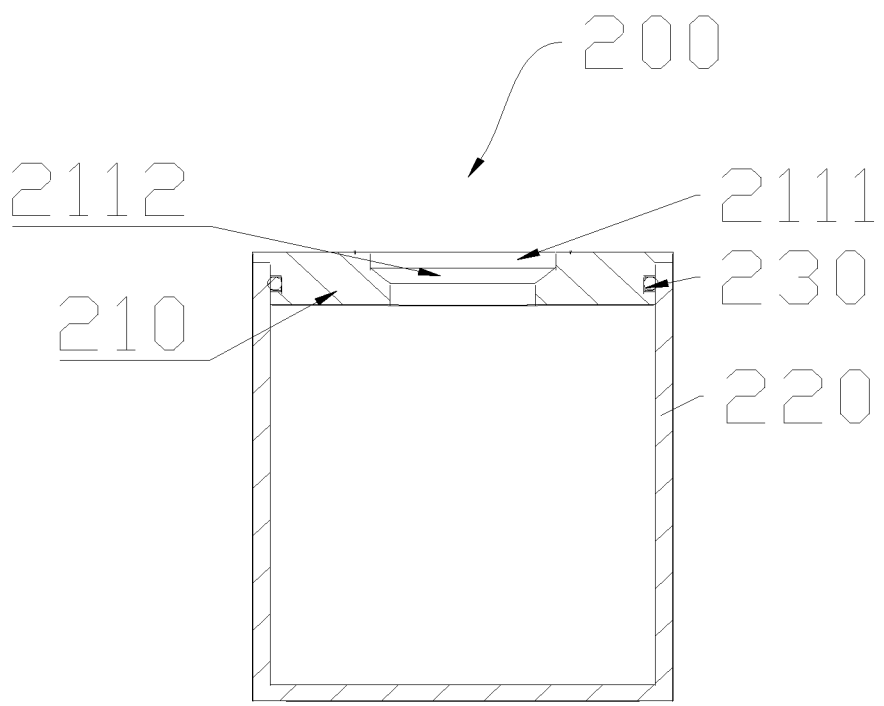
FIG. 5 shows a sectional view of a sealed cabin according to an embodiment.

With reference to FIG. 5, in some embodiments, the sealing hole 211 is composed of two parts, i.e., a big hole 2111 and a small hole 2112, wherein the diameter of the big hole 2111 is greater than that of the small hole 2112, and the diameter of the small hole 2112 decreases gradually along a direction away from the big hole 2111. When the sealing plug 300 is arranged in the sealing hole 211, the sealing portion 320 cooperates with the small hole 2112, while the connecting portion 310 cooperates with the big hole 2111, and when the sealing portion 320 abuts against the hole wall of the small hole 2112, the thickness of the sealing plug 300 in the axial direction of the sealing hole 211 is greater than the depth of the sealing hole 211. When the fixing assembly 400 is fixed on the sealed cabin 200, the connecting portion 310 is caused to be compressed and deformed accordingly, such that the sealing portion 320 is closely attached to the small hole 2112, hereby realizing an interference fit, and enabling waterproofing sealing between the sealing plug 300 and the sealed cabin 200.

In some embodiments, the sealed cabin 200 is a control cabin of underwater machinery equipment, the control cabin is in connection with multiplex functional equipment via the cables 100, and the control cabin can realize signal transmission through the multiple cables 100, so as to control the multiplex function equipment to achieve different functions. However, without being limited thereto, it could be understood that in other embodiments, the sealed cabin 200 may also be a pressure cabin or other cabin sealed by multiple penetrating cables 100.

In some embodiments, the sealed cabin 200 is composed of a cabin cover 210 and a cabin body 220, wherein the cabin cover 210 is covered on the cabin body 220, the side of the cabin cover 210 away from the cabin body 220 is provided with the sealing hole 211, the sealing plug 300 is occluded in the sealing hole 211, and when the multiple cables 100 connect components inside the sealed cabin 200, the multiple cables 100 and the sealed cabin 200 are sealed in a waterproofing manner by means of the sealing device.

In some embodiments, the sealing plug 300 is a rubber plug, but in other embodiments, the sealing plug 300 may also be a silicone plug or a fluororubber plug. The material of the surface of the cable 100 may be identical with the material of the sealing plug 300, so as to facilitate the integrated injection molding of the cable 100 and the sealing plug 300.

The fixing assembly 400 includes a fixing block 410 and a fixing piece 420. The fixing block 410 is arranged on the side of the connecting portion 310 away from the sealed cabin 200, the fixing block 410 is provided with a first fixing hole 430, the cabin cover 210 is provided with a corresponding second fixing hole 212, and the fixing piece 420 successively penetrates the first fixing hole 430 and the second fixing hole 212 and is arranged inside the cabin cover 210, so as to fix the sealing plug 300 on the cabin cover 210 and compress the same tightly.

In some embodiments, the fixing piece 420 is a screw, and the inner walls of the first fixing hole 430 and the second fixing hole 212 are respectively provided with screw threads, wherein the screw cooperates with the screw threads, such that the fixing block 410 and the cabin cover 210 are in fixed connection with each other. However, without being limited thereto, it could be understood that in other embodiments, the fixing piece 420 may also be a bolt, and a nut cooperating with the bolt is respectively provided in the first fixing hole 430 and in the second fixing hole 212, which can also achieve the effect of fixed connection.

In some embodiments, the fixing block 410 is an integrated structure, and before the multiple cables 100 are fixedly connected to the sealing plug 300, the multiple cables 100 are firstly simultaneously inserted in the fixing block 410, and the sealing plug 300 is then fixedly connected with the cables 100.

Figure 6:
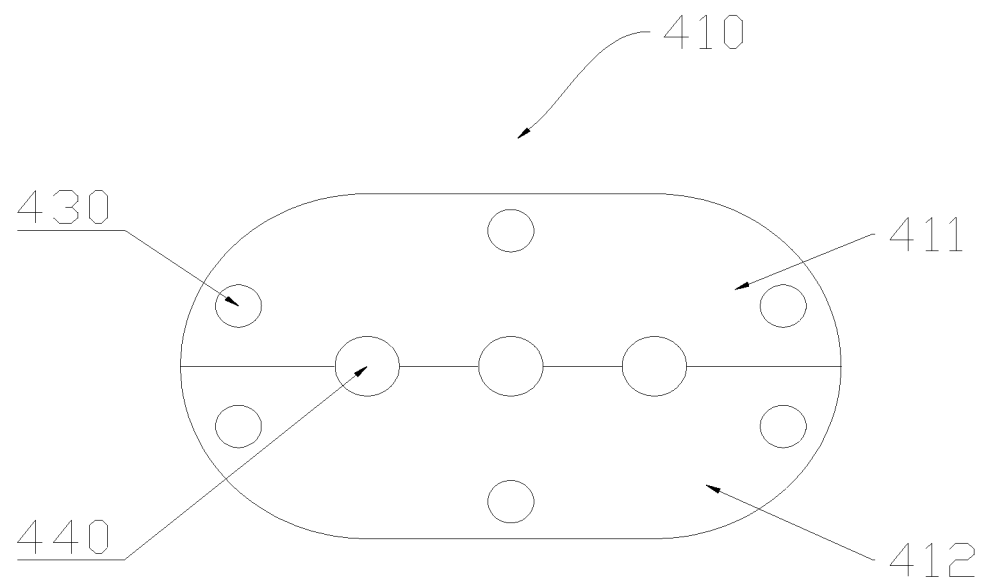
FIG. 6 shows a top view of a fixing block according to an embodiment.

As shown in FIG. 6, in other embodiments, the fixing block 410 may also be configured as a split type structure, and the fixing block 410 is composed of a first fixing block 411 and a second fixing block 412. The first fixing block 411 and the second fixing block 412 are distributed symmetrically with respect to the junction therebetween serving as an axis, the junction between the first fixing block 411 and the second fixing block 412 is provided with a plurality of through holes 440, and the through holes 440 are symmetrically arranged with respect to the junction therebetween serving as an axis; while the fixing block 410 is provided with the plurality of through holes 440, and each of the through holes 440 is provided inside with a corresponding cable 100. The diameter of the through hole 440 is greater than the diameter of the cable 100, so as to facilitate the arrangement of the cable 100 in the through hole 440.

The first fixing block 411 and the second fixing block 412 are each provided with the first fixing hole 430, and the first fixing holes 430 are symmetrically distributed on the first fixing block 411 and the second fixing block 412 with respect to the junction between the first fixing block 411 and the second fixing block 412 serving as an axis.

When the sealing plug 300 is arranged in the sealing hole 211, the first fixing block 411 is docked with the second fixing block 412, the multiple cables 100 are respectively arranged in different through holes 440, the fixing piece 420 successively penetrates the first fixing hole 430 and the second fixing hole 212, and the fixing block 410 is fixed on the sealed cabin 200, such that the first fixing block 411 and the second fixing block 412 apply compression on the connecting portion 310. The split type design of the fixing block 410 not only facilitates the mounting and the disassembly of the fixing block 410 and the multiple cables 100, but also reduces the usage costs, since only the damaged part needs to be replaced when the fixing block 410 is damaged.

Figure 7:
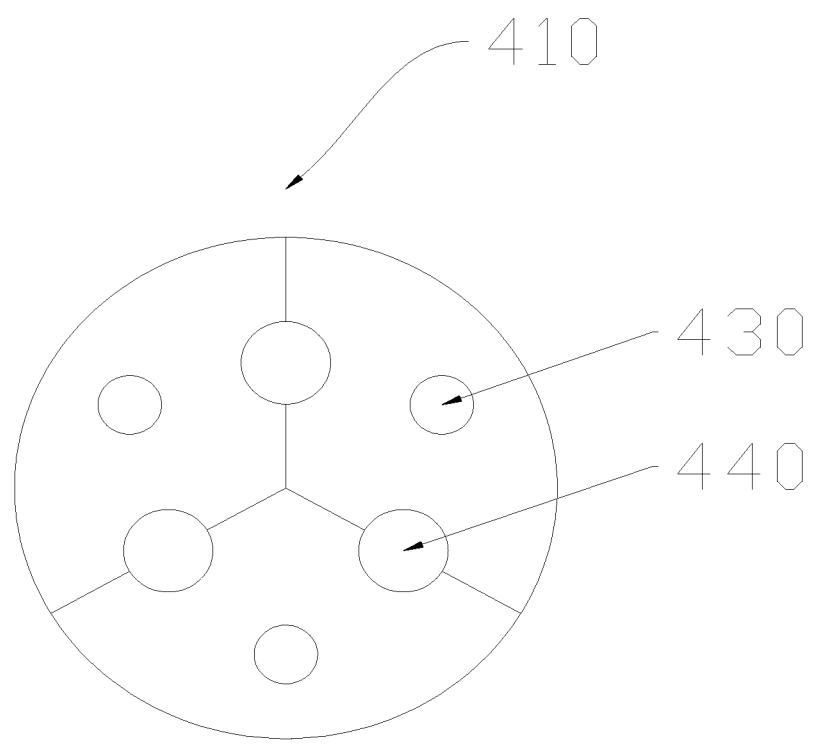
FIG. 7 shows a top view of a fixing block according to another embodiment.

As shown in FIG. 7, in some embodiments, the fixing block 410 may also be formed through the combination of three parts, wherein the cross section of each part in the radial direction of the through hole 440 is a sector of 120 degrees, and the fixing block 410 composed of the three parts has a circular cross section in the radial direction of the through hole 440. The junction between every two parts is provided with at least one through hole 440, and each part is at least provided with one first fixing hole 430. Such a design of the fixing block 410 can improve the space utilization of the fixing block 410 by the cables 100, which is advantageous for miniaturization configuration of the fixing block 410.

In some embodiments, a sealing ring 230 is sleeved over the cabin cover 210, wherein the sealing ring 230 is an O-shaped rubber sealing ring 230, and the sealing ring 230 is constructed to seal the junction between the cabin cover 210 and the cabin body 220.

In some embodiments, during use of the sealing device, the multiple cables 100 and the sealing plug 300 are firstly formed as an integrated structure by way of integrated injection molding, hereby realizing sealed connection between the sealing plug 300 and the multiple cables 100. The sealing plug 300 is then occluded in the sealing hole 211, and the fixing block 410 is fixed on the cabin cover 210 through the fixing piece 420; because the thickness of the sealing plug 300 is greater than the depth of the sealing hole 211, the fixing block 410 compresses the connecting portion 310, resulting in an interference fit between the sealing portion 320 and the sealing hole 211, and waterproofing sealing between the multiple cables 100 and the sealed cabin 200 is finally achieved.

As for the sealing device according to the present embodiment, multiple cables 100 and the sealing plug 300 are enabled to form an overall structure by making the multiple cables 100 simultaneously fixedly connected with the sealing plug 300, and the sealing plug 300 is then fixed on the sealed cabin 200 through the fixing assembly 400, hereby realizing the sealing between the multiple cables 100 and the sealed cabin 200. Compared with the sealing realized by means of a watertight joint, the sealing device according to the present disclosure is not only simple in structure, but also lower in cost and relatively small in volume, thus is particularly suitable for use in circumstances in which the sealed cabin needs to connect multiplex functional equipment but has limited space.

In some further embodiments of the present disclosure, a piece of underwater machinery equipment is further provided, which may comprise a sealing device provided according to preceding embodiments of the present disclosure. The sealing device is configured for waterproofing sealing respectively between both ends of each of multiple cables 100 and the underwater machinery equipment and functional equipment when the underwater machinery equipment is connected to the functional equipment through the multiple cables 100.

The underwater machinery equipment may be an underwater robot, an underwater detector, or any other equipment capable of working under water. The functional equipment may be a camera instrument, a mechanical arm, a detector or the like.

The underwater machinery equipment can control the working of various pieces of functional equipment under water, and the sealed cabin 200 of the underwater machinery equipment is respectively in connection with the respective pieces of functional equipment through the multiple cables 100. In some embodiments, when the multiple cables 100 are in sealed connection with the sealed cabin 200, one ends of the multiple cables 100 and the sealing plug 300 are formed as an integrated structure by way of integrated injection molding, hereby realizing the waterproofing sealing between the multiple cables 100 and the sealing plug 300. The sealing plug 300 is then occluded in the sealing hole 211 of the sealed cabin 200, the sealing plug 300 is fixed on the sealed cabin 200 through the fixing assembly 400 and compressed tightly, and the sealing plug 300 cooperates with the sealing hole 211, achieving the cooperation between the sealing plug 300 and the sealing hole 211, and completing the waterproofing sealing of the multiple cables 100 and the sealed cabin 200.

The fixing block 410 of the fixing assembly 400 may be configured as a split type structure, that is to say, the fixing block 410 may be formed by combining multiple parts, and compared with an overall structure, as for the split type fixing block 410, it is unnecessary to mount the fixing block 410 before fixed connection between the multiple cables 100 and the sealing plug 300, which facilitates the mounting and the disassembly of the fixing block 410, while the usage costs are reduced, since only the damaged part needs to be replaced when the fixing block 410 is damaged.

In the description of the present specification, description referring to terms such as "an embodiment", "some embodiments", "example", "specific example" or "some examples" means that specific features, structures, materials, or characteristics described with reference to this embodiment or example are included in at least one embodiment or example of the present disclosure. In the present specification, schematic expressions of the above-mentioned terms are not necessarily targeted at same embodiment or example. Moreover, the described specific features, structures, materials, or characteristics can be combined in any one or more embodiments or examples in a suitable way. In addition, without causing any contradictory, a person skilled in the art could incorporate and combine different embodiments or examples described in the present specification and features of different embodiments or examples with each other.

Although the embodiments of the present disclosure are shown and described above, it could be understood that the above embodiments are illustrative and should not be construed as limiting the present disclosure; and a person ordinarily skilled in the art could make modifications, amendments, substitutions, and variations to the above embodiments within the scope of the present disclosure.

INDUSTRIAL APPLICABILITY

The present disclosure provides a sealing device and a piece of underwater machinery equipment, relating to the technical field of underwater sealing devices. The sealing device comprises a sealing plug and a fixing assembly, wherein the sealing plug is in fixed connection with multiple cables, and the fixing assembly is constructed to fix the sealing plug on a sealed cabin in an abutting manner, such that the sealing plug is occluded in the sealed cabin. The underwater machinery equipment comprises the sealing device as described above. Compared with the seal realized by means of a watertight joint, the sealing device according to the present disclosure is not only simple in structure, but also low in cost and relatively small in volume, thus is particularly suitable for use in circumstances in which the sealed cabin needs to connect multiplex functional equipment but has limited space.

In addition, it could be understood that the sealing device and the underwater machinery equipment according to the present disclosure are reproducible, and can be used in various industrial applications. For example, the sealing device and the underwater machinery equipment according to the present disclosure can be used in any field requiring underwater seal.

The invention claimed is:

1. A sealing device configured for performing sealing between multiple cables and a sealed cabin, comprising a sealing plug and a fixing assembly,
wherein the sealing plug is in fixed connection with the multiple cables, and the fixing assembly is configured to fix the sealing plug on the sealed cabin in an abutting manner, such that the sealing plug is occluded in the sealed cabin,
wherein the fixing assembly comprises a fixing block and a fixing piece, wherein the fixing block is arranged on a side of the sealing plug away from the sealed cabin, and the fixing piece is configured to fix the fixing block on the sealed cabin, such that the fixing block compresses the sealing plug,
the fixing block is composed of a first fixing block and a second fixing block, and a junction between the first fixing block and the second fixing block is provided with at least one through hole, in each of which a corresponding cable is arranged.

2. The sealing device according to claim 1, wherein the sealed cabin is provided with a sealing hole, and the fixing assembly is configured to fix the sealing plug in the sealing hole in an abutting manner.

3. The sealing device according to claim 2, wherein the sealing plug is in an interference fit with the multiple cables respectively; and alternatively, the sealing plug and the multiple cables are formed as an integrated structure by way of integrated injection molding.

4. The sealing device according to claim 2, wherein the sealing plug comprises a connecting portion and a sealing portion, the connecting portion is connected to a side of the sealing portion away from the sealed cabin, and the sealing portion is in an interference fit with the sealing hole through the fixing assembly.

5. The sealing device according to claim 4, wherein the connecting portion and the sealing portion are in fixed connection with each other by way of integrated molding.

6. The sealing device according to claim 4, wherein a diameter of the connecting portion is greater than a diameter of the sealing portion, and the diameter of the sealing portion decreases gradually in a direction away from the connecting portion.

7. The sealing device according to claim 6, wherein the sealing hole comprises a big hole and a small hole, wherein the big hole cooperates with the connecting portion, and the small hole cooperates with the sealing portion.

8. The sealing device according to claim 7, wherein a diameter of the big hole is greater than a diameter of the small hole, and the diameter of the small hole decreases gradually in a direction away from the big hole.

9. The sealing device according to claim 7, wherein a thickness of the sealing plug is greater than a depth of the sealing hole.

10. The sealing device according to claim 7, wherein the fixing block is composed of a first fixing block and a second fixing block, and a junction between the first fixing block and the second fixing block is provided with at least one through hole, in each of which a corresponding cable is arranged.

11. The sealing device according to claim 1, wherein the sealed cabin is composed of a cabin cover and a cabin body, wherein the cabin cover is covered on the cabin body, a side of the cabin cover away from the cabin body is provided with a sealing hole, and the sealing plug is occluded in the sealing hole, wherein when the multiple cables connect components inside the sealed cabin, the multiple cables and the sealed cabin are sealed in a waterproofing manner through the sealing device.

12. The sealing device according to claim 11, wherein the fixing block is provided with a first fixing hole, the cabin cover is provided with a corresponding second fixing hole, and the fixing piece successively penetrates the first fixing hole and the second fixing hole and is arranged inside the cabin cover, so as to fix the sealing plug on the cabin cover and compress the sealing plug tightly.

13. The sealing device according to claim 11, wherein a sealing ring is sleeved over the cabin cover, and the sealing ring is configured to seal a junction between the cabin cover and the cabin body.

14. The sealing device according to claim 1, wherein a diameter of each of the at least one through hole is greater than a diameter of the corresponding cable.

15. The sealing device according to claim 1, wherein the first fixing block and the second fixing block are distributed symmetrically with respect to a junction between the first fixing block and the second fixing block serving as an axis.

16. The sealing device according to claim 1, wherein the first fixing block and the second fixing block are each provided with a first fixing hole, and the first fixing holes are symmetrically distributed on the first fixing block and the second fixing block with respect to the junction between the first fixing block and the second fixing block serving as an axis.

17. Underwater machinery equipment, comprising the sealing device according to claim 1.

18. The sealing device according to claim 1, wherein the fixing assembly comprises a fixing block and a fixing piece, wherein the fixing block is arranged on a side of the sealing plug away from the sealed cabin, and the fixing piece is configured to fix the fixing block on the sealed cabin, such that the fixing block compresses the sealing plug.

* * * * *